Dec. 2, 1969 R. S. COE ET AL 3,482,140

THREE-DIMENSIONAL DISPLAY APPARATUS

Filed Feb. 27, 1967

INVENTORS:
ROBERT S. COE
JOSEPH H. VOGELMAN
BY
Curtis, Morris & Safford
ATTORNEYS.

United States Patent Office 3,482,140

Patented Dec. 2, 1969

3,482,140

THREE-DIMENSIONAL DISPLAY APPARATUS

Robert S. Coe, Circuit Drive, Tuxedo Park, Tuxedo, N.Y. 10987, and Joseph H. Vogelman, 48 Green Drive, Roslyn, N.Y. 11576

Filed Feb. 27, 1967, Ser. No. 618,970
Int. Cl. H01j *29/70*
U.S. Cl. 315—21 5 Claims

ABSTRACT OF THE DISCLOSURE

A cathode ray tube having a plurality of similar filament arrays disposed one behind the other and behind the window of the cathode ray tube. The filaments are adapted to luminesce when bombarded by electrons. Corresponding filaments of the different arrays are displaced from one another so that an electron beam may impinge on any of the filaments as the beam scans the arrays and each filament may be viewed forward of the tube. The electron beam is steered selectively to the filaments, whereby different portions of the different arrays are illuminated at selected times.

The present invention relates, in general, to display devices and, in particular, to a cathode ray tube for three-dimensional viewing.

Various attempts have been made to provide a visual display which affords an observer a view of intelligence in three dimensions. Among the applications of such displays are television, radar and terrain appreciation. In some of these efforts, the apparatus which produces the visual display actually possesses three dimensions, while in others a two-dimensional display is presented to the observer with the third dimension effected through auxiliary equipment. Typical of the latter class of systems is the use of a stereoptic presentation wherein the observer's eyes simultaneously view two different planar displays.

While some of the three-dimensional display systems which have been developed in the past have met with varying degrees of success, none appear to satisfy all or most of the requirements for use in home television receivers. Generally, a display device for a home television receiver must be reasonable in cost if it is to be a successful consumer item. Secondly, such a display device should be compatible with the usual two-dimensional television presentations. Furthermore, this device should be compatible both with black and white and color viewing. In addition, it is preferable not to require the observer to employ auxiliary equipment such as special viewing glasses.

Accordingly, it is an object of the present invention to provide a new and improved three-dimensional display device.

It is another object of the present invention to provide a three-dimensional display device which is reasonable in cost, compatible with two-dimensional viewing and with black and white as well as with color, and does not require the observer to employ special auxiliary equipment.

Briefly, the three-dimensional display device of the present invention employs a cathode ray tube within which there is disposed a plurality of filament arrays positioned one behind the other and behind the viewing window of the cathode ray tube. Each of the arrays has a plurality of specially treated filaments. The filaments are adapted to luminesce when bombarded by electrons and corresponding filaments of the different arrays are displaced from one another as viewed from the opposite side of the window. An electron gun is provided for developing an electron beam and for directing this beam toward the filament arrays to illuminate points on the arrays. Means are provided for deflecting the electron beam to scan the filament arrays in a predetermined pattern. In addition, means are provided for selectively steering the electron beam to different filaments of the different arrays at selected times. Thus, as the electron beam scans the filament arrays, the beam impinges upon the different filament arrays and points on the different arrays are illuminated. As a result, three-dimensional intelligence is presented as points on the different filament arrays are illuminated. If necessary, conventional divergent optical elements may be provided forward of the viewing window of the cathode ray tube to enhance the presentation. When this cathode ray tube is adapted for use in a television receiver, the filament members extend across the face of the tube parallel to each other and the arrays are scanned progressively in the usual sequential line pattern.

For a better understanding of the present invention, together with other and further objects thereof, reference is made to the following description, taken in connection with the accompanying drawing, and its scope will be pointed out in the appended claims.

Referring to the drawing.

Figures 1, 2, 3:
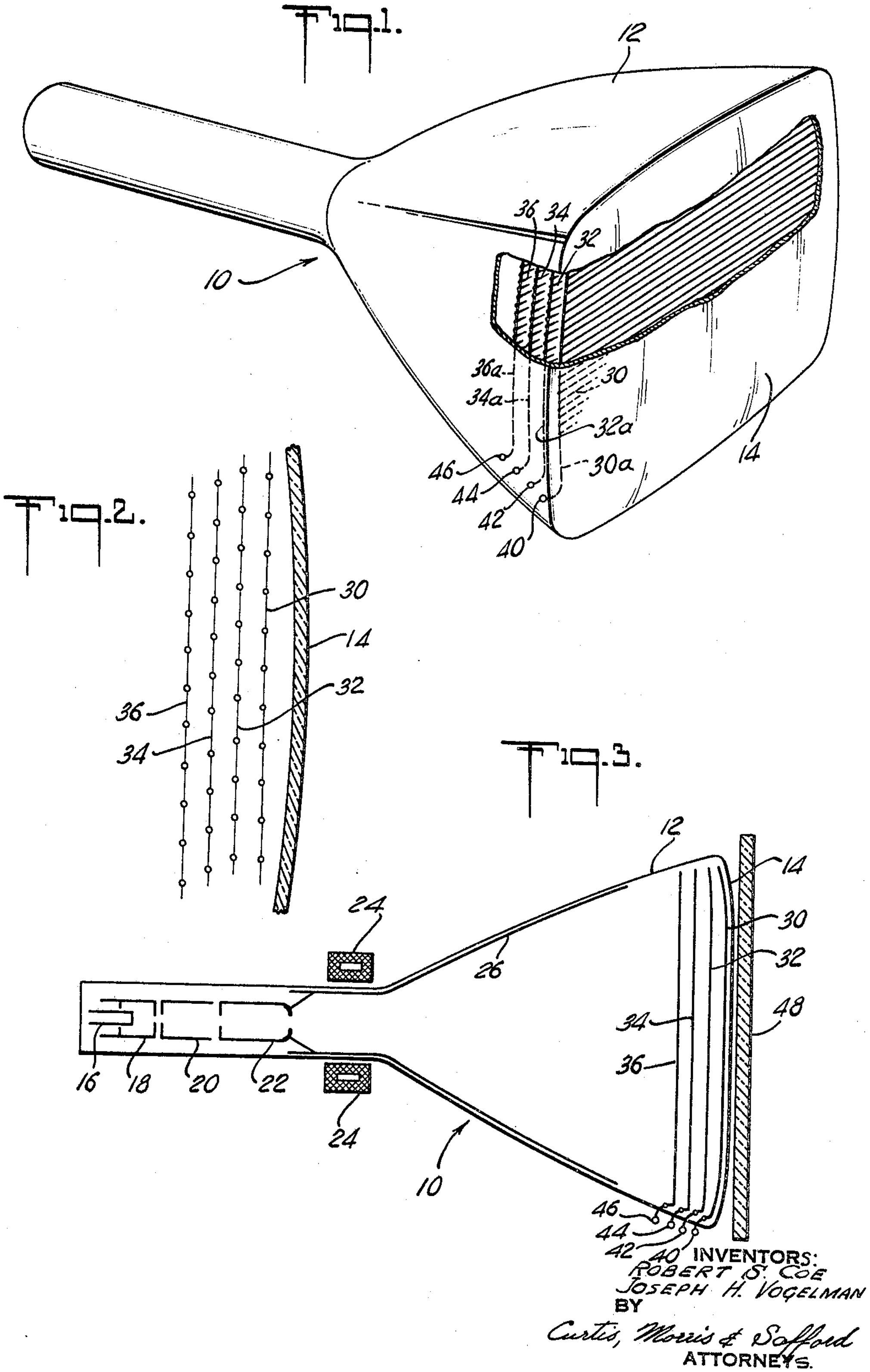
FIGURE 1 is a perspective view of a cathode ray tube constructed in accordance with the present invention with a portion cut away.
FIGURE 2 is a vertical section, on an enlarged scale, of the screen portion of the cathode ray tube of FIGURE 1.
FIGURE 3 is a vertical section of the cathode ray tube of FIGURE 1.

Referring to FIGURES 1, 2 and 3, the cathode ray tube 10 includes an enclosure 12 having a transparent window 14 which together define an evacuated envelope. Located in the neck of the cathode ray tube 10 are the usual component parts for developing an electron beam. In particular, there is provided a cathode 16, a control grid 18, a first anode 20, and a second anode 22. Deflection coils 24 (not shown in FIGURE 1) are provided for deflecting the electron beam horizontally and vertically. The deflection signals supplied to the deflection coils 24 cause the electron beam to scan across the face of the cathode ray tube in the usual sequential line pattern. An aquadag coating 26 extends from the neck of the cathode ray tube toward the window 14.

Located behind the viewing window 14 is a plurality of filament arrays 30, 32, 34 and 36 which are disposed one behind the other within the tube. Each of these arrays has a plurality of specially treated fine filaments which extend parallel to each other and lie in the same plane. All the filaments of each array are individually interconnected electrically by end wires **30*a*, 32*a*, 34*a* and 36*a* which, in turn, lead to terminals 40, 42, 44 and 46** accessible at the outside of the cathode ray tube.

The filaments of the arrays 30, 32, 34 and 36 are so arranged as to provide a view of all the filaments from the front of the cathode ray tube and at the same time providing an unobstructed path to each filament for the electron beam. The number of filaments of each array is equal to the number of lines of resolution specified for the particular television system, for example, 525 lines in the United States.

One type of filament which may be employed in the arrays 30, 32, 34 and 36 is a fine conductive wire coated with phosphor which will glow at the point of excitation by the electron beam with an intensity proportional to the current of the beam at that instant of time. Another type of filament which may be employed is a transparent dielectric fibre such as glass. Conductive wire filaments are used in the embodiment of the invention illustrated.

As the electron beam scans across the filament arrays 30, 32, 34 and 36, the usual video signal, containing two-dimentional intelligence, is supplied from a video amplifier (not shown) to the control grid of the cathode ray tube in the normal manner. As this occurs, the conductive filament arrays are energized selectively to attract the electron beam at selected times to cause the two-dimensional intelligence contained in the signal supplied to the control grid to be displayed in three dimensions. In particular, depth information signals, synchronized with the video signal supplied to the control grid and the deflection signals supplied to coils 24, are coupled selectively to terminals 40, 42, 44 and 46 to energize the arrays 30, 32, 34 and 36, respectively. These signals control the specific array on which each specific bit of picture information will cause illumination by making the specific array more positive than the others to attract the electron beam. Although a slight amount of distortion is introduced into the display because of the vertical displacement between corresponding filaments in the different arrays, this distortion is not discernible by an observer located at the normal distance from the face of the cathode ray tube.

The depth information signals may be derived by conventional techniques. For example, these signals may be derived from signals generated by conventional cameras, operating in pairs, or by a three-dimensional camera or by similar well-known equipment.

When a dielectric fibre is employed for the filaments, the steering of the electron beam to the desired filaments may be accomplished through the beam deflection system. The depth information signals would supplement the vertical deflection signals to cause the beam to impinge directly upon the particular filament.

Positioned between the arrays and an observer is a conventional divergent optical element 48. This element serves to stretch the apparent depth the desired amount.

It should be appreciated that the cathode ray tube 10 may be employed for displaying information in two-dimensions. This is accomplished by continuously energizing the same filament array so that the electron beam always impinges upon the same array.

Although four filament arrays are employed in the illustrated embodiment of the invention, it will be understood that a different number may be used dependent upon the application of the cathode ray tube and the desired degree of resolution.

As previously indicated, the individual filaments are so positioned as to provide an unobstructed path to each filament for the electron beam. This results in a non-uniform arrangement of the filaments. However, the non-uniformity is so slight as to not be discernible by an observer located at the normal distance from the face of the cathode ray tube. The pattern of the filament elements may be made uniform by the addition of auxiliary deflection components for steering the electron beam.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the inveniton.

What is claimed is:

1. A cathode ray tube for three-dimensional viewing comprising:
  - an enclosure having a transparent window and defining an evacuated envelope;
  - a plurality of arrays disposed one behind the other within said envelope and behind said window, said arrays having transparent dielectric fibers adapted to luminesce when bombarded by electrons and correponding transparent dielectric fibers of different arrays displaced from one another as viewed from the opposite side of said window;
  - an electron gun for developing an electron beam and for directing said beam toward said arrays;
  - means for deflecting said electron beam to scan said arrays in a predetermined pattern; and
  - means for steering said electron beam to impinge upon selected ones of said dielectric fibers as said arrays are scanned, whereby selected ones of said fibers are illuminated.

2. A cathode ray tube for three-dimensional viewing comprising:
  - an enclosure having a transparent window and defining an evacuated envelope;
  - a plurality of arrays disposed one behind the other within said envelope and behind said window, said arrays having transparent dielectric fibers adapted to luminesce when bombarded by electrons and corresponding transparent dielectric fibers of different arrays displaced from one another as viewed from the opposite side of said window;
  - an electron gun for developing an electron beam and for directing said beam toward said arrays;
  - means for deflecting said electron beam to scan said arrays in a predetermined pattern; and
  - means for sequentially energizing selected ones of said dielectric fibers to attract electrons to said selected fibers to form sequential depth segment of images.

3. A cathode ray tube for three-dimensional viewing comprising:
  - an enclosure having a transparent window and defining an evacuated envelope;
  - a plurality of filament arrays disposed one behind the other within said envelope and behind said window, each of said arrays having a plurality of electrically interconnected transparent dielectric fibers disposed parallel to each other and adapted to luminesce when bombarded by electrons;
  - an electron gun for developing an electron beam and for directing said beam toward said arrays;
  - means for deflecting said electron beam to scan said arrays in a sequential line pattern; and
  - means for sequentially energizing selected ones of said dielectric fibers to attract electrons to said selected fibers to form sequential depth segment of images.

4. A cathode ray tube according to claim 3 wherein corresponding transparent dielectric fibers of different arrays are displaced vertically from one another.

5. A cathode ray tube according to claim 4 wherein all the fibers of a single array lie in the same plane.

References Cited

UNITED STATES PATENTS

| | | | |
|---|---|---|---|
| 2,602,145 | 7/1952 | Law | 315—21 X |
| 2,795,730 | 6/1957 | Fromm et al. | 315—21 |
| 2,971,117 | 2/1961 | Law | 315—21 X |
| 3,089,917 | 5/1963 | Fernicola | 178—6.5 |

RODNEY D. BENNETT, Jr., Primary Examiner

B. L. RIBANDO, Assistant Examiner